United States Patent
Massoudi et al.

(10) Patent No.: US 7,483,901 B1
(45) Date of Patent: Jan. 27, 2009

(54) SYSTEM AND METHOD FOR DATA TRANSFER BETWEEN TWO OR MORE CONNECTED SOFTWARE SERVICES

(75) Inventors: Arash Massoudi, Dublin, CA (US); Sandra Irene Zylka, Dublin, CA (US)

(73) Assignee: Nextaxiom Technology, Inc., San Francisco, CA (US)

( * ) Notice: Subject to any disclaimer, the term of this patent is extended or adjusted under 35 U.S.C. 154(b) by 196 days.

(21) Appl. No.: 10/711,317

(22) Filed: Sep. 10, 2004

Related U.S. Application Data

(60) Provisional application No. 60/481,350, filed on Sep. 10, 2003.

(51) Int. Cl.
  G06F 17/00 (2006.01)
  G06F 7/00 (2006.01)
(52) U.S. Cl. .................. 707/100; 707/102; 707/103 Y; 717/104; 717/126; 715/854
(58) Field of Classification Search ............. 707/103 R, 707/103 Z, 100, 102
See application file for complete search history.

(56) References Cited

U.S. PATENT DOCUMENTS

| | | | |
|---|---|---|---|
| 5,768,588 A | 6/1998 | Endicott et al. | |
| 5,774,583 A * | 6/1998 | Sasaki et al. | 382/190 |
| 6,253,366 B1 | 6/2001 | Mutschler, III | |
| 6,457,064 B1 | 9/2002 | Huff et al. | |
| 6,563,441 B1 * | 5/2003 | Gold | 341/67 |
| 6,665,677 B1 * | 12/2003 | Wotring et al. | 707/100 |
| 6,684,222 B1 * | 1/2004 | Cornelius et al. | 707/104.1 |
| 6,697,363 B1 * | 2/2004 | Carr | 370/389 |
| 6,775,822 B1 * | 8/2004 | Apte et al. | 717/120 |
| 6,804,773 B1 | 10/2004 | Grigsby et al. | |
| 6,832,219 B2 * | 12/2004 | Lal | 707/3 |
| 6,917,620 B1 * | 7/2005 | Sindhu et al. | 370/401 |
| 6,925,631 B2 * | 8/2005 | Golden | 717/115 |
| 6,985,939 B2 | 1/2006 | Fletcher et al. | |
| 6,996,589 B1 * | 2/2006 | Jayaram et al. | 707/204 |
| 7,159,185 B1 * | 1/2007 | Vedula et al. | 715/763 |
| 7,171,672 B2 | 1/2007 | Just | |
| 7,194,485 B2 * | 3/2007 | Kaipa et al. | 707/104.1 |

(Continued)

OTHER PUBLICATIONS

Ahumada et al. Specifying Fractal and GCM Component with UML, Chilean Society of Computer Science, 2008, SCCC '07, XX, Nov. 8-9, 2007, pp. 53-63.*

*Primary Examiner*—Baoquoc N To
(74) *Attorney, Agent, or Firm*—Workman Nydegger

(57) ABSTRACT

Methods, systems, frameworks and software products are disclosed for metadata definition of data mappings and automatic integrity enforcement and transfer of data at runtime between inputs and outputs of two or more connected software services, including but not limited to "Web Services", software components, or between said entities and programming constructs. The disclosed invention provides a high performance and scalable system for storing data associated to any well-defined, complex data type with plurality. A technique for capturing the mapping description between data elements of many optionally nested data structures with or without plurality is disclosed. A method and system, based on the said description, for storing the data associated to the said well-defined but arbitrary structures in embedded arrays of lookup tables with a unique addressing scheme is used for automatic data transfer, data transformation, and data integrity enforcement at runtime.

18 Claims, 13 Drawing Sheets

U.S. PATENT DOCUMENTS

2004/0015564 A1    1/2004  Williams
2004/0183838 A1*   9/2004  Lahiri .................. 345/854
2004/0239674 A1*  12/2004  Ewald et al. ............ 345/440
2005/0015491 A1    1/2005  Koeppel
2005/0044197 A1    2/2005  Lai
2005/0050526 A1*   3/2005  Dahne-Steuber et al. .... 717/136
2005/0182779 A1*   8/2005  Perry et al. ............ 707/101

* cited by examiner

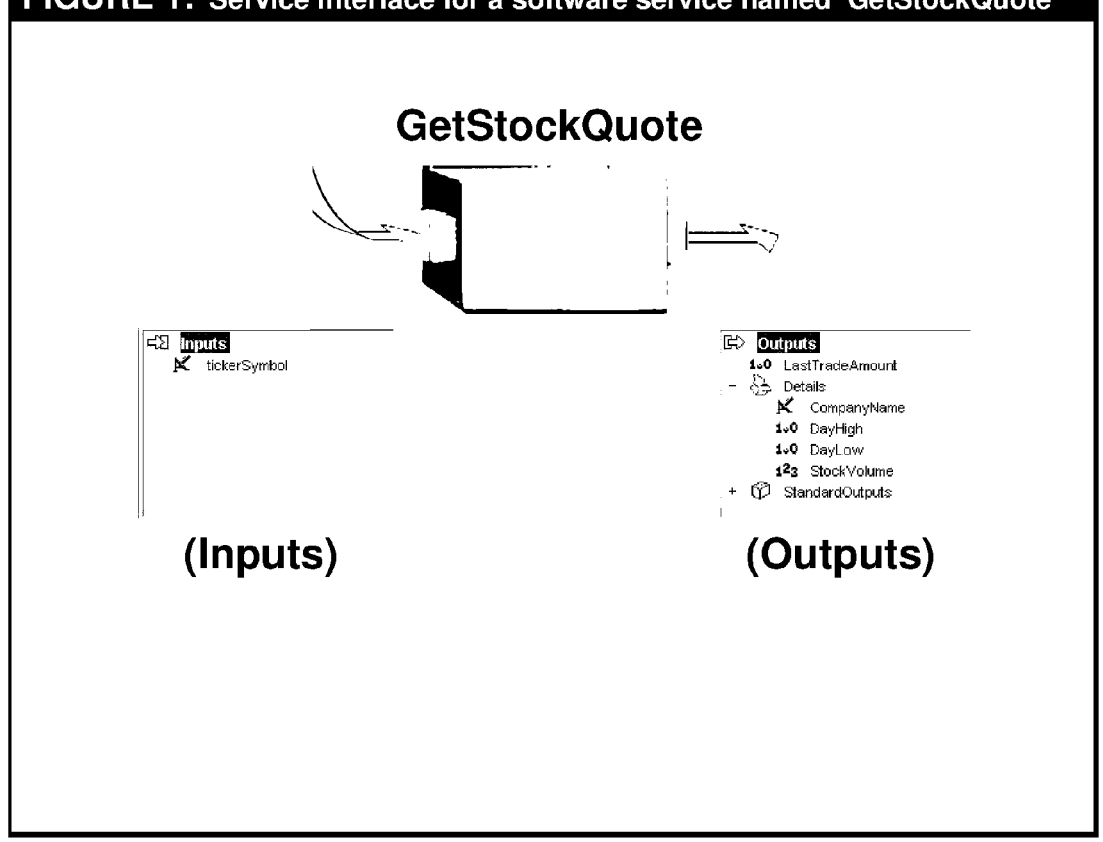

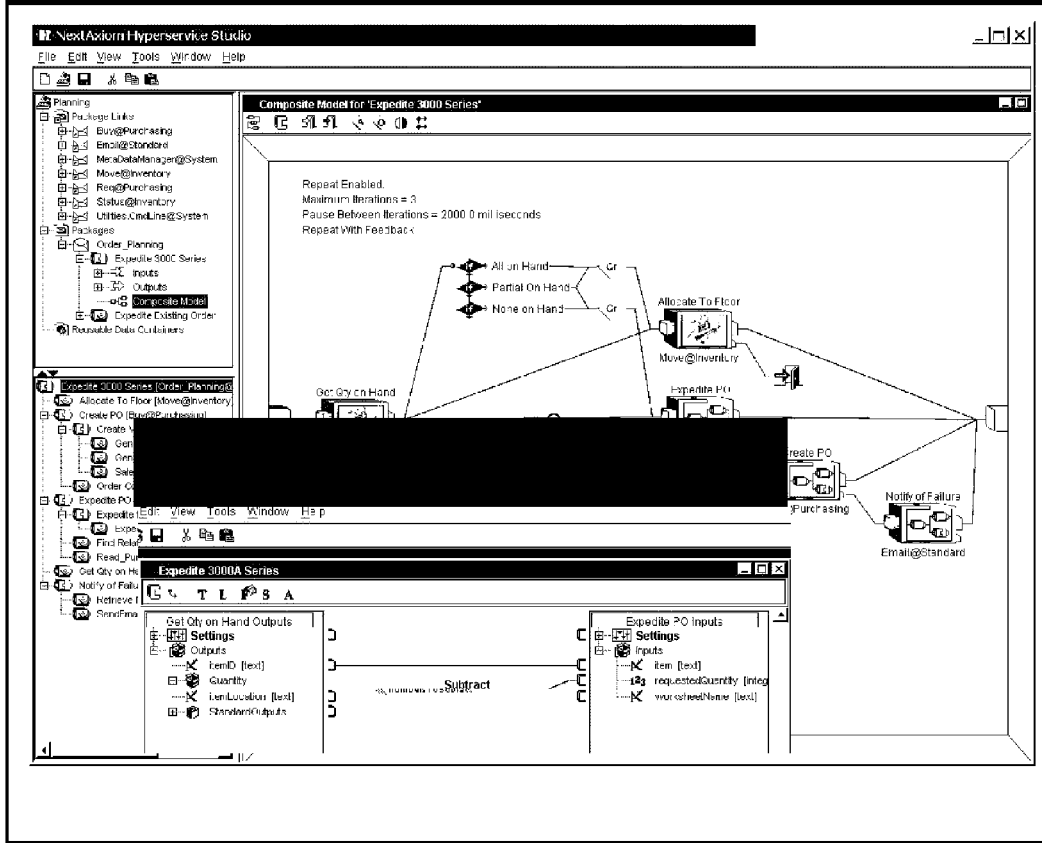

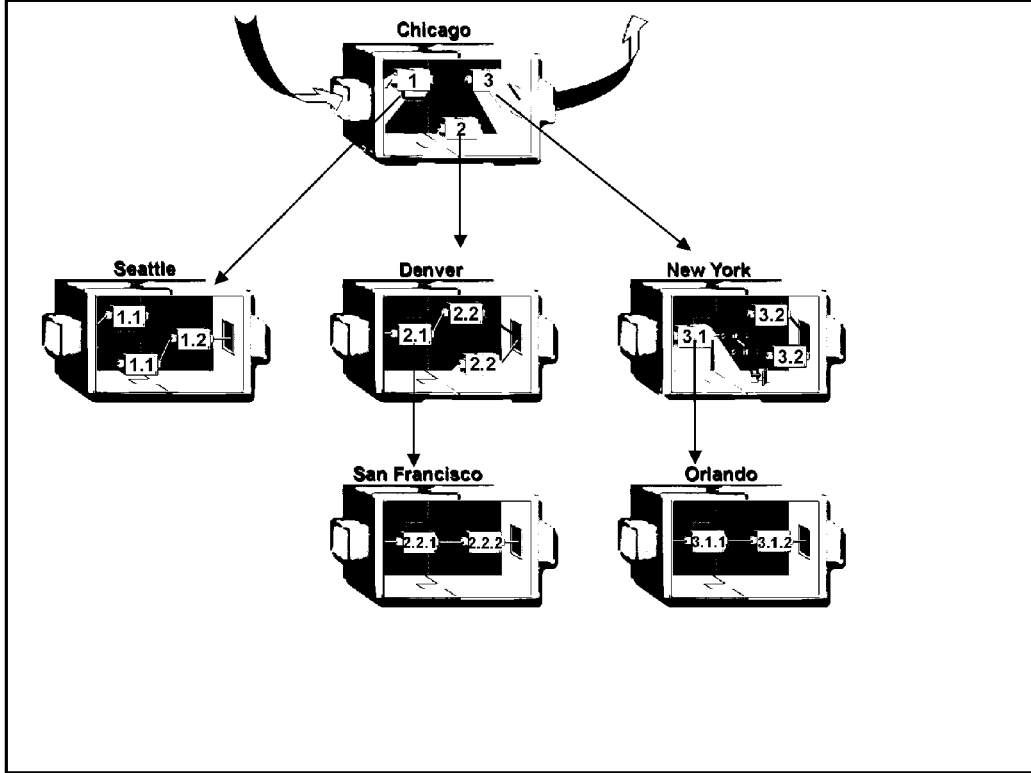

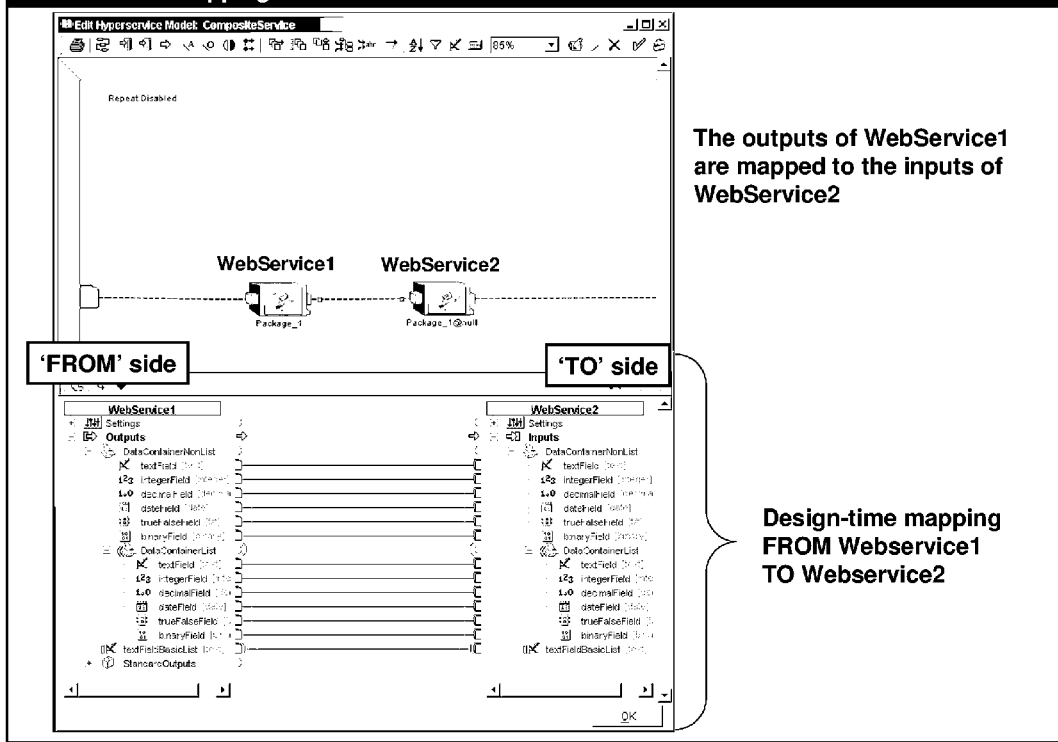

FIGURE 5: XML representation of the mapping depicted in FIGURE 4

```xml
- <IncomingNode activateUponFailure="false" incomingKey="1000_116_19861858601.1">
  - <ToListGroup cpfgLevelForParentTlg="-1" groupAbsPath="Inputs" relativeDataPath="">
    - <CPFromGroup groupAbsPath="Outputs" groupDataPath="">
        <ConnectedPair fromAbsPath="Outputs/DataContainerNonList/textField" fromDataPath="DataContainerNonList/textField"
          toAbsPath="Inputs/DataContainerNonList/textField" toDataPath="DataContainerNonList/textField" />
        <ConnectedPair fromAbsPath="Outputs/DataContainerNonList/integerField" fromDataPath="DataContainerNonList/integerField"
          toAbsPath="Inputs/DataContainerNonList/integerField" toDataPath="DataContainerNonList/integerField" />
        <ConnectedPair fromAbsPath="Outputs/DataContainerNonList/decimalField" fromDataPath="DataContainerNonList/decimalField"
          toAbsPath="Inputs/DataContainerNonList/decimalField" toDataPath="DataContainerNonList/decimalField" />
        <ConnectedPair autoConversionFlag="true" fromAbsPath="Outputs/DataContainerNonList/dateField" fromDataPath="DataContainerNonList/dateField"
          toAbsPath="Inputs/DataContainerNonList/dateField" toDataPath="DataContainerNonList/dateField" />
        <ConnectedPair fromAbsPath="Outputs/DataContainerNonList/trueFalseField" fromDataPath="DataContainerNonList/trueFalseField"
          toAbsPath="Inputs/DataContainerNonList/trueFalseField" toDataPath="DataContainerNonList/trueFalseField" />
        <ConnectedPair fromAbsPath="Outputs/DataContainerNonList/binaryField" fromDataPath="DataContainerNonList/binaryField"
          toAbsPath="Inputs/DataContainerNonList/binaryField" toDataPath="DataContainerNonList/binaryField" />
        <ConnectedPair fromAbsPath="Outputs/textFieldBasicList" fromDataPath="textFieldBasicList" isFromDataList="true" isToDataList="true"
          toAbsPath="Inputs/textFieldBasicList" toDataPath="textFieldBasicList" />
        <groupDataPathSegments numSegments="0" postDotConversion="true" />
      </CPFromGroup>
    - <ToListGroup cpfgLevelForParentTlg="-1" groupAbsPath="Inputs/DataContainerNonList/DataContainerList"
        relativeDataPath="DataContainerNonList/DataContainerList">
      - <CPFromGroup groupAbsPath="Outputs/DataContainerNonList/DataContainerList" groupDataPath="DataContainerNonList/DataContainerList">
          <ConnectedPair fromAbsPath="Outputs/DataContainerNonList/DataContainerList/textField" fromDataPath="textField"
            toAbsPath="Inputs/DataContainerNonList/DataContainerList/textField" toDataPath="textField" />
          <ConnectedPair fromAbsPath="Outputs/DataContainerNonList/DataContainerList/integerField" fromDataPath="integerField"
            toAbsPath="Inputs/DataContainerNonList/DataContainerList/integerField" toDataPath="integerField" />
          <ConnectedPair fromAbsPath="Outputs/DataContainerNonList/DataContainerList/decimalField" fromDataPath="decimalField"
            toAbsPath="Inputs/DataContainerNonList/DataContainerList/decimalField" toDataPath="decimalField" />
          <ConnectedPair autoConversionFlag="true" fromAbsPath="Outputs/DataContainerNonList/DataContainerList/dateField" fromDataPath="dateField"
            toAbsPath="Inputs/DataContainerNonList/DataContainerList/dateField" toDataPath="dateField" />
          <ConnectedPair fromAbsPath="Outputs/DataContainerNonList/DataContainerList/trueFalseField" fromDataPath="trueFalseField"
            toAbsPath="Inputs/DataContainerNonList/DataContainerList/trueFalseField" toDataPath="trueFalseField" />
          <ConnectedPair fromAbsPath="Outputs/DataContainerNonList/DataContainerList/binaryField" fromDataPath="binaryField"
            toAbsPath="Inputs/DataContainerNonList/DataContainerList/binaryField" toDataPath="binaryField" />
        - <groupDataPathSegments numSegments="1" postDotConversion="true">
            <Segment dataPath="DataContainerNonList/DataContainerList" index="0" />
          </groupDataPathSegments>
        </CPFromGroup>
      </ToListGroup>
    </ToListGroup>
  </IncomingNode>
```

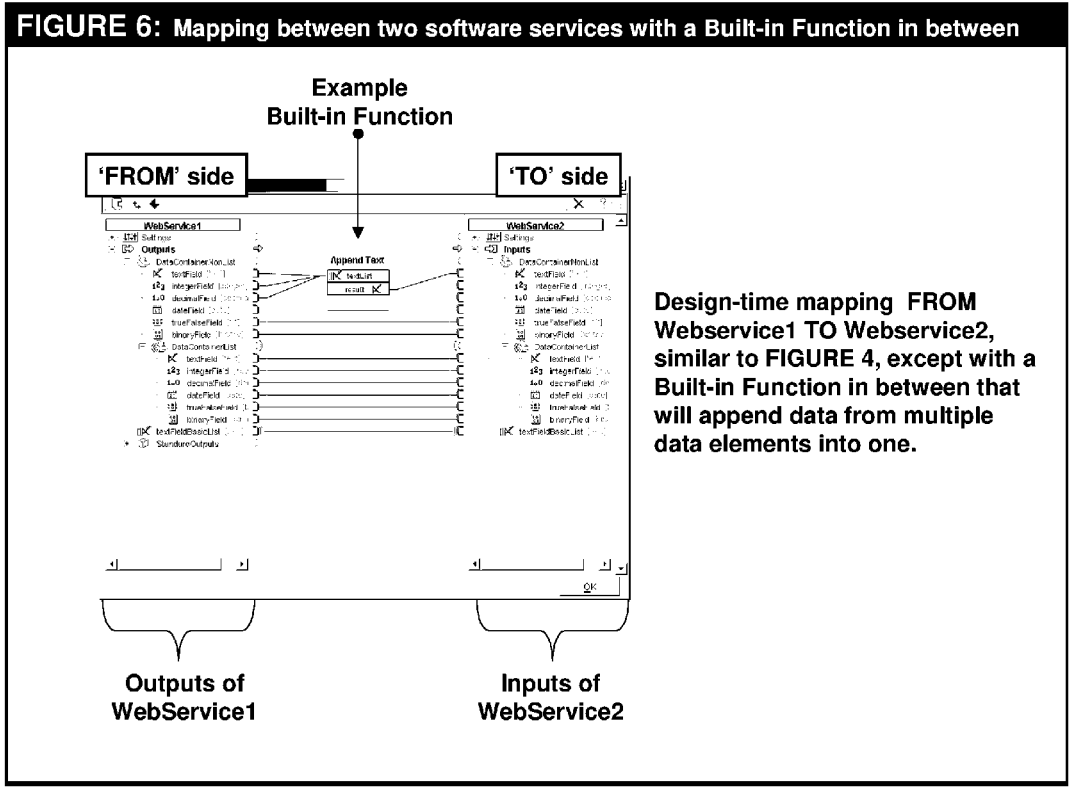

Figure 7:
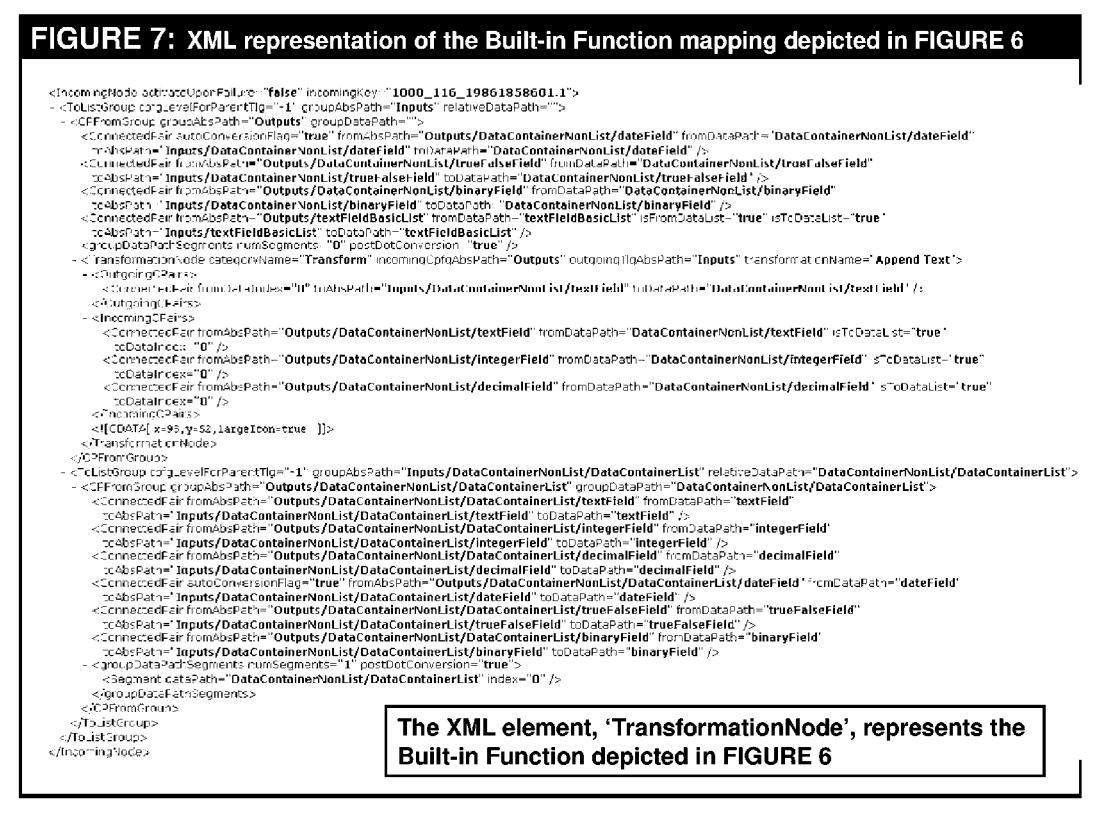

FIGURE 7: XML representation of the Built-in Function mapping depicted in FIGURE 6

The XML element, 'TransformationNode', represents the Built-in Function depicted in FIGURE 6

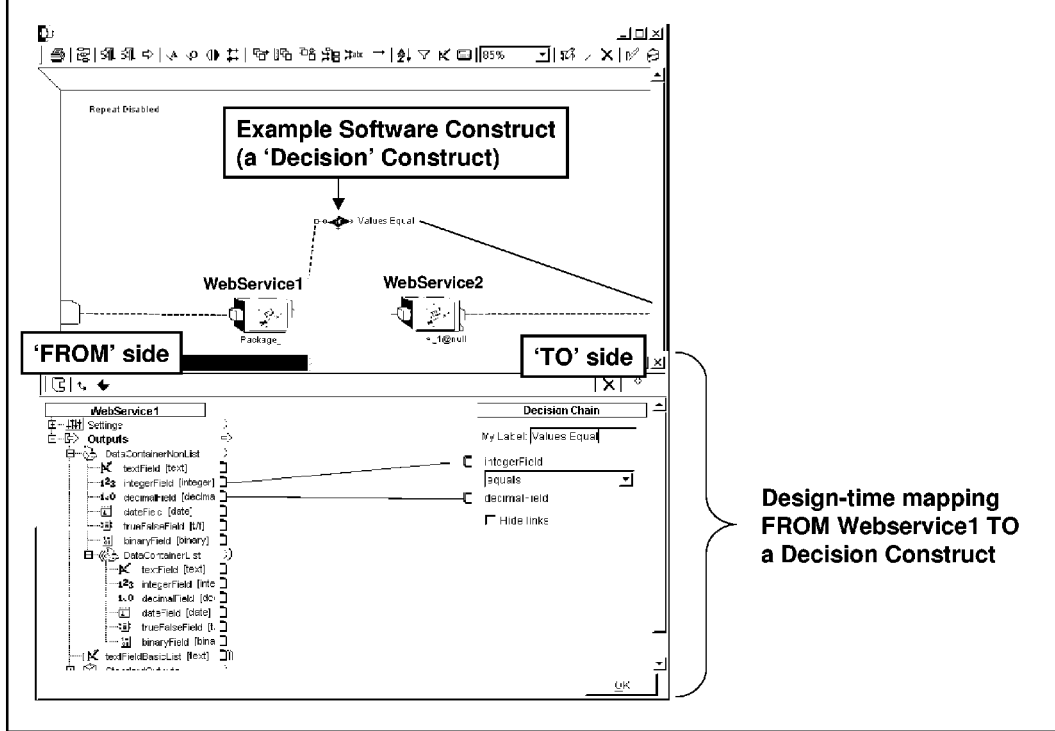

FIGURE 9: XML representation of mapping to a Decision Construct depicted in FIGURE 8

```
- <DecisionConstruct id="3" occurrence="1">
    <IncomingNode activateUponFailure="false" incomingKey="1000_116_19861858601.1" />
    < [CDATA[ x=372,y=189, ]]>
  - <DecisionBranch branchType="if" customLabel="Values Equal" lhsIncomingKey="1000_116_19861858601.1" operator="equals" rhsIncomingKey="1000_116_19861858601.1"
      useCustomLabel="true">
      <LHS_OR_Common>
      - <CPFromGroup groupAbsPath="Outputs" groupDataPath="">
          <ConnectedPair fromAbsPath="Outputs/DataContainerNonList/integerField" fromDataPath="DataContainerNonList/integerField" toDataIndex="0" />
          <groupDataPathSegments numSegments="0" postDotConversion="true" />
        </CPFromGroup>
      </LHS_OR_Common>
    - <RHS>
      - <CPFromGroup groupAbsPath="Outputs" groupDataPath="">
          <ConnectedPair fromAbsPath="Outputs/DataContainerNonList/decimalField" fromDataPath="DataContainerNonList/decimalField" toDataIndex="1" />
          <groupDataPathSegments numSegments="0" postDotConversion="true" />
        </CPFromGroup>
      </RHS>
    </DecisionBranch>
    <DecisionBranch branchType="else" customLabel="My Label" operator="equals" />
  </DecisionConstruct>
```

The XML element, 'DecisionConstruct', represents the Decision Construct depicted in FIGURE 8

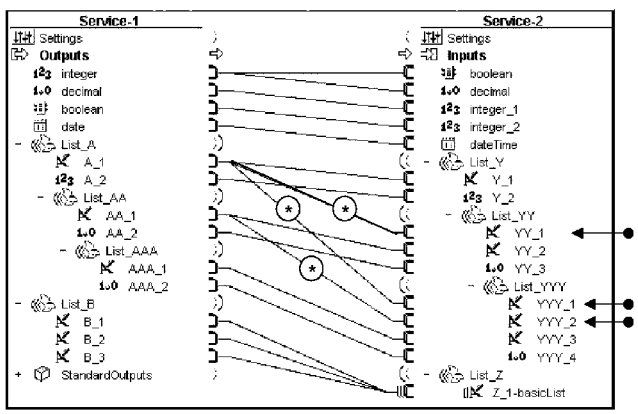
Figure 10: Mapping that results in data "flattening"
DESIGN-TIME:
Defining how data should be transferred from Service-1 to Service-2. Mappings where data is flattened is marked by an asterisk(*)

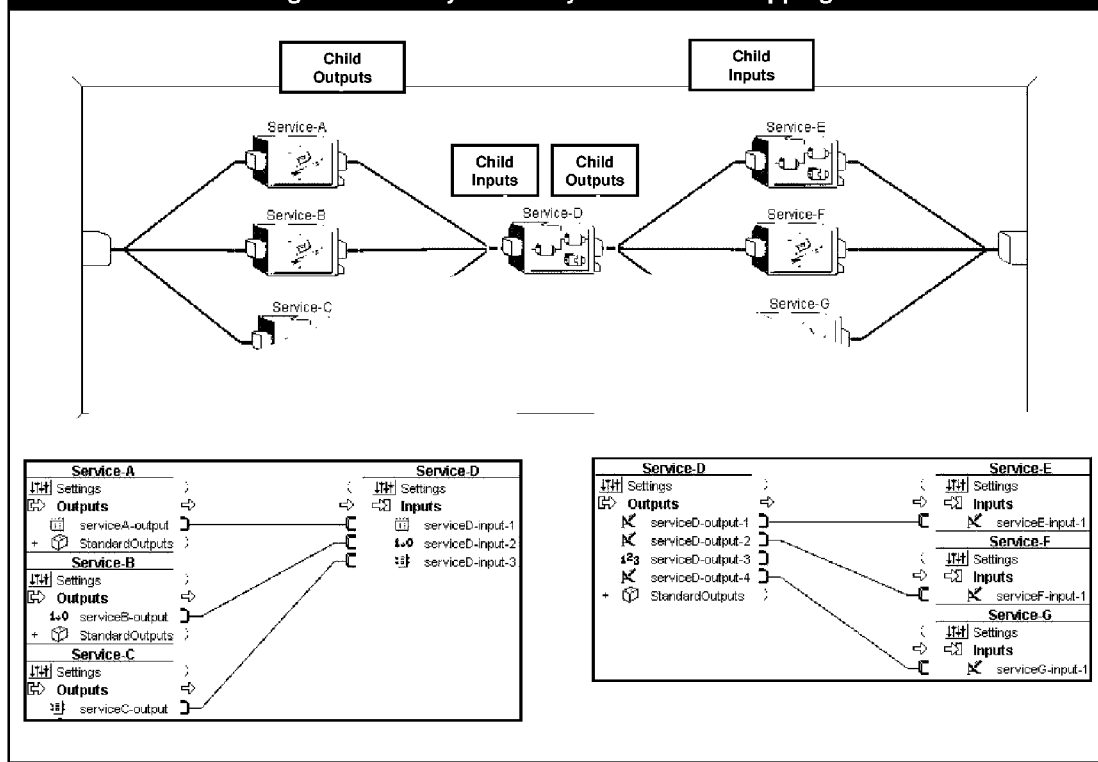

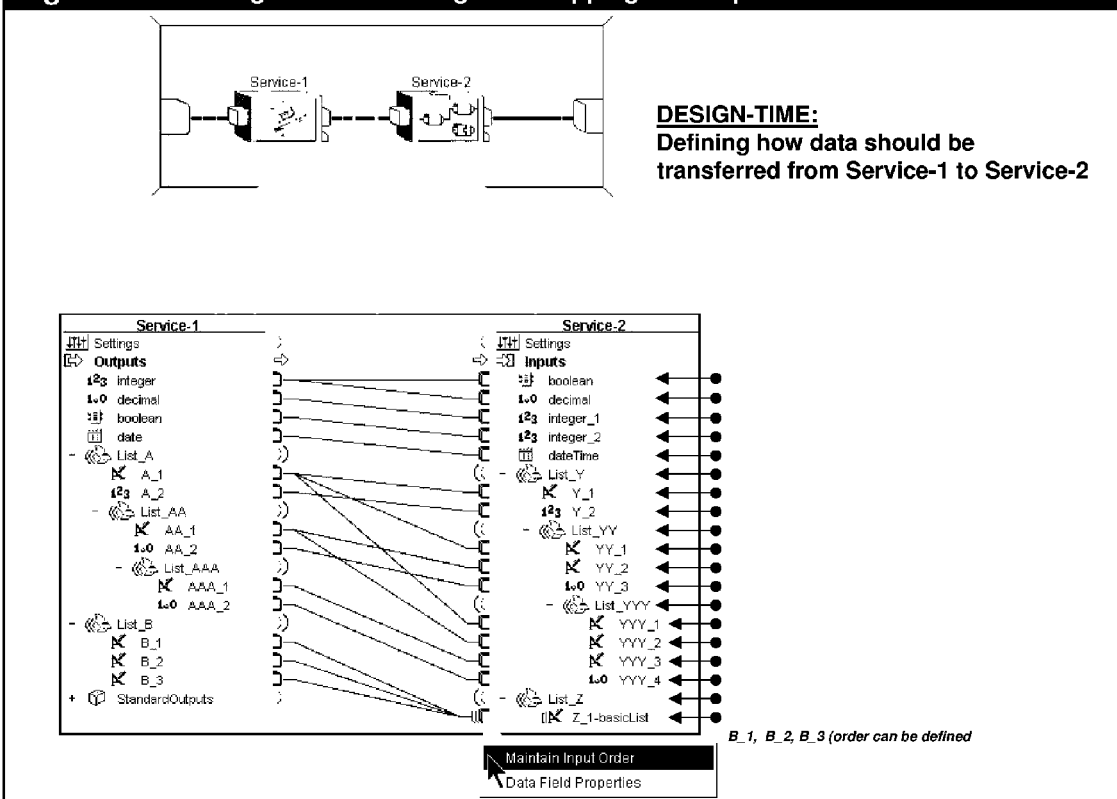

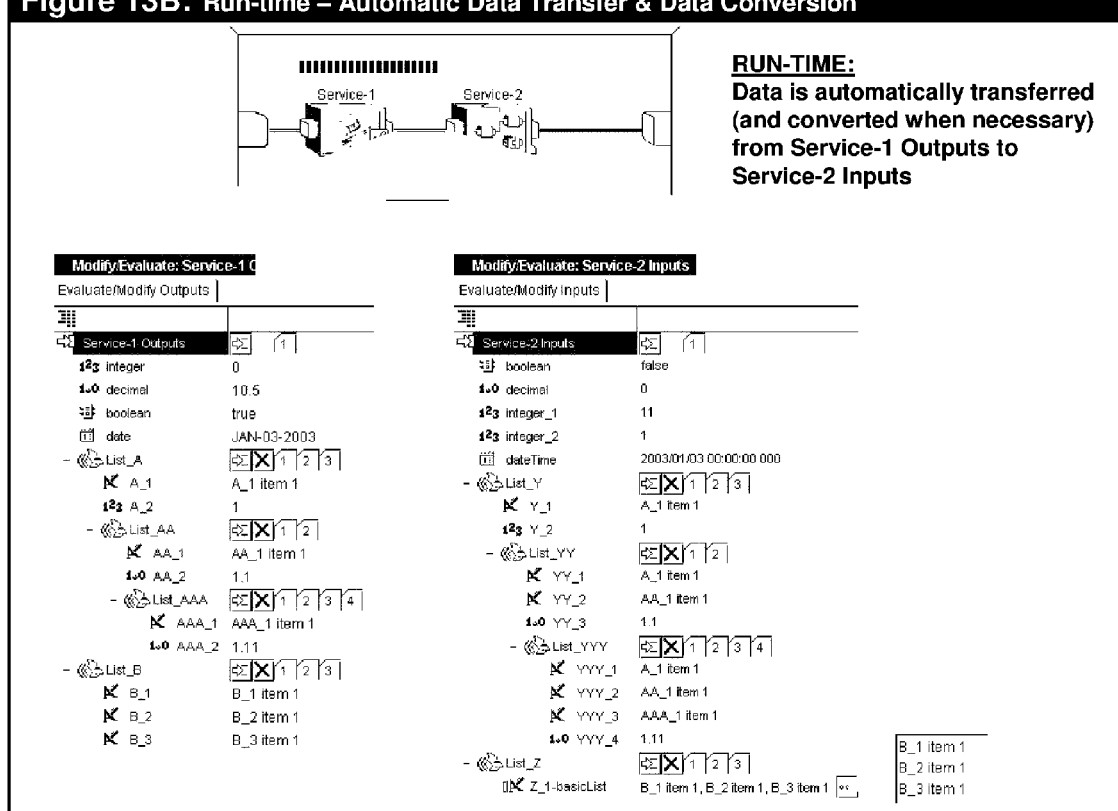

SYSTEM AND METHOD FOR DATA TRANSFER BETWEEN TWO OR MORE CONNECTED SOFTWARE SERVICES

CROSS-REFERENCES TO RELATED APPLICATIONS

This application claims the benefit of U.S. Provisional Application Ser. No. 60/481,350, filed on Sep. 10, 2003, entitled "Automatic, high-performance data transfer between two or more connected software services, such as but not limited to Web Services, with arbitrarily defined, and optionally complex input/output data structures", which is incorporated herein by reference.

BACKGROUND OF THE INVENTION

1. Field of the Invention

The present invention relates to the field of computer software and, in particular, to a system and method for automatic transfer of data and interface integrity enforcement between two or more linked software services, including but not limited to Web Services and semantic-based programming constructs, with arbitrarily defined and optionally complex input/output data structures.

2. Description of the Related Art

In a service-oriented program, mapping and transferring data between the inputs and outputs of dependent software services, including but not limited to Web Services, running in a related sequence, is one of the most time-consuming software development tasks. In the current art, most of these mappings are manually coded in object-oriented programming languages such as C++, Java and C# and/or in syntax-based scripting languages such as XSLT. The manual coding of data transfer between related software services results in hard-coded, and one-off solutions that are hard to create and time consuming to debug, and maintain. On the other hand, there are a few graphical mapping and automated data transfer tools used in the area of message-oriented application integration. These tools are best suited for mapping message documents with simple to average complexity of structure and limited nested plurality, and when applied to mapping optionally complex data structures resulting from input/output of software services, suffer from lack of many-to-many mapping functionality, performance and scalability. Furthermore, the current art is missing a high-performance mechanism for automatically enforcing data integrity for input and output data of a software service at runtime.

The current art of service-oriented programming and application development is lacking a specialized semantic-based means of mapping data from arbitrary data structures between the outputs and inputs of software services (as well as between semantic-based programming constructs) that has a scalable and high performance system for automatic transfer of data and integrity enforcement at runtime based on a semantic description. The absence of the said high performance, scalable mechanism that can apply to software services can seriously restrict the applications of service-oriented programming and architecture.

3. General Background

A software service, or service for short, including but not limited to a Web service, is a discrete software task that has a well-defined interface and may be accessible over the local and/or public computer networks or maybe only available on a single machine. Web services can be published, discovered, described, and accessed using standard-based protocols such as UDDI, WSDL, and SOAP/HTTP.

A software service interface, in concept, represents the inputs and outputs of a black-boxed software service as well as the properties of that service, such as name and location. Take, for example, the interface of a simple software service named GetStockQuote, which retrieves simple stock quote information [FIG. 1]. This service takes a ticker symbol input and returns the last trade price amount as well as some additional stock quote details, such as the day high and day low. Note that in order to use, or consume a service, only knowledge of its interface is required. This means that as long as the interface of a service remains the same, different implementations of the service can be swapped in and out without affecting its consumers. This, as well as the fact that a service is a language- and platform-neutral concept, is one of the keys to the flexibility of service-oriented architectures.

An atomic service is a software service that is implemented directly by a segment of software code. In the existing NextAxiom™ HyperService™ Platform, atomic Web services are dispatched via a library. A library is a light, language- and platform-neutral wrapper that is linked to one or more atomic Web service implementations. Atomic Web services are logically indivisible Web services that represent "raw materials" to the HyperService™ platform.

A composite service is a software service that consumes any number of other atomic or composite services. In the HyperService™ platform, a composite Web service is implemented with a metadata-driven model that is automatically interpreted by a high-performance run-time engine.

Visual metadata models, which represent composite software services implementations to the HyperService™ system, are created in a graphical, design-time environment and stored as XML models. This environment offers a new and powerful visual modeling paradigm that can be leveraged to enable the visual modeling of transactional behavior. This environment was specifically designed to enable collaborative, on-the-fly creation of software services by business process analysts or functional experts, who understand the business logic and application required to implement real-world business processes and applications, but have no knowledge of programming paradigms or Web service protocols. FIG. 2 captures the implementation of a composite software service named "Expedite 3000 Series". This service is used by a master planner to expedite 3000-series inventory items when they fall short on the shop floor. This service was developed collaboratively and reuses services that were selectively exposed by the Inventory and Purchasing departments to the developers of this service.

Any software service that is consumed by a composite service model is said to be "nested" or "embedded" within that composite service. FIG. 3 depicts a hypothetical composite service that resides in Chicago. This software service is composed of other composite services that are distributed across the country.

SUMMARY OF THE INVENTION

A principle object of the present invention is to provide a system and a method for defining and automating mapping of data between inputs and outputs of two or more connected software services, such as but not limited to "Web services", with arbitrarily defined and optionally complex input/output data structures.

The present invention provides a means for storing data associated with inputs and outputs of a software service or to any complex data structure in memory. Furthermore, the present invention provides a set of methods for high-performance access to the stored data with optional plurality such that data can systematically be read and written at any depth of containment, regardless of its plurality. A mechanism is provided for enforcing the integrity of data while the data values are being set as well as after the last data values have been set. Furthermore, a semantic-based means, that does not require any coding or scripting, is provided through a mapping tool. The mapping tool is used to semantically define how data should be transferred between data elements. The mapping tool enforces a set of mapping rules, between inputs and outputs of the services, or more generally between two arbitrarily defined data structures. The said mapping definitions are expressed in metadata, using a markup language, for the use by the system that automates data transfer. The mapping definitions, together with the method used for storing and retrieving the data, allows the automating system to systematically fetch data from one data structure and set data on another structure. An extensible framework for defining built-in transformation functions capable of transforming or operating on data, with well-defined input and output structures is provided. The said framework provides a method for transferring data from one data structure to the inputs of a built-in function and from the outputs of the built-in function to another data structure.

Other objects and advantages of this invention will be set in part in the description and in the drawings that follow and, in part, will be obvious from the description, or may be learned by practice of the invention. Accordingly, the drawings and description are to be regarded as illustrative in nature, and not as restrictive.

To achieve the forgoing objectives, and in accordance with the purpose of the invention as broadly described herein, the present invention provides methods, frameworks, and systems for defining and automating mapping of data between inputs and outputs of two or more connected software services or data structures, with arbitrary definition, and optionally nested, input/output data structures with optional plurality. In preferred embodiments, this technique comprises: using a mapping tool to define the relation and association between data elements of two or more arbitrarily defined data structures; enforcing a well-defined set of rules to restrict users as to what they can map; optionally, transferring data through built-in functions; storing the description of the said mapping using a machine readable format or markup language such as but not limited to XML; expressing the association and mapping of data elements in the said description using a unique path identifier with an absolute and relative path addressing scheme; using a key-based look-up molding technique for storing the actual data associated to connected data structures in memory; using a list, or equivalent structure, of lookup tables for storing the data and data type information where the said list corresponds to a Data Container with plurality; using the said lookup tables used to store the data associated with the data elements and data types; automating the transfer of the actual data based on the said description of the mapping and the said method of in-memory storage of actual data and enforcing data integrity at runtime. Furthermore, techniques for storing and retrieving data associated to arbitrarily defined structures are disclosed that are also used by the automated mapping system of the present invention.

The techniques and methods of the present invention provide a high-performance and automated way of transferring data between any number of connected, arbitrary data structures and eliminates the time consuming and mundane task of manual coding or scripting of data transfer when creating software applications. In one embodiment of the present invention, semantic-based definition of data mapping and automated, high-performance and scalable data transfer from many-to-many software services, including but not limited to Web Services, enables rapid development of service-oriented applications. In general, service-oriented architecture and applications are known for their value in reducing the cost of integration and application development while extending the agility of an application. Without a high-performance, scalable and generic method for mapping, transferring and transforming data between the inputs and outputs of connected software services, service-oriented programming and architecture will become highly restricted in its applications and thus its benefits will become restricted to a subset of the problem domain that it could have otherwise been applied. The present invention addresses this shortcoming for the current art of service-oriented application development.

The present invention will now be described with reference to the following drawings, in which like reference numbers denote the same element throughout. It is intended that any other advantages and objects of the present invention that become apparent or obvious from the detailed description or illustrations contained herein are within the scope of the present invention.

BRIEF DESCRIPTION OF THE DRAWINGS

FIG. 1 graphically depicts the interface definition for a software service named 'GetStockQuote', including the definition of the data elements that comprise the service Inputs and Outputs.

FIG. 2 shows the implementation of an example composite software service.

FIG. 3 illustrates an exploded view of a composite software service that contains other software services, some of which are distributed in different locations.

FIG. 4 shows a mapping tool that allows a user to map data elements between two connected software services, and thus define how data should be transferred from one service to the other during runtime by a system that automates the data transfer.

FIG. 5 is an XML representation of the mapping generated by the mapping tool shown in FIG. 4, where data elements are mapped between the outputs of a software service to the inputs of another.

FIG. 6 shows a mapping between the two connected software services shown in FIG. 4, but this time with a built-in function between the two software services. The mapping defines how to transfer data from the outputs of a software service to the inputs of a built-in function and from the outputs of the built-in function to the inputs of a software service.

FIG. 7 is an XML representation of the mapping generated by the mapping tool shown in FIG. 6, where data elements are mapped from the outputs of a service to the inputs of a built-in function and from the outputs of a built-in function to the inputs of a service.

FIG. 8 shows the mapping of data elements from the outputs of a service to the inputs of a decision construct.

FIG. 9 is an XML representation of the mapping generated by the mapping tool shown in FIG. 7, where data elements are mapped from the outputs of a service to the inputs of a decision construct.

FIG. 10 shows the mapping of hierarchical data elements with plurality that will result in the "flattening" of data as it is transferred from one service to another.

FIG. 12 shows how data elements from one service can be mapped to many services as well as how data elements from many services can be mapped to one service.

FIG. 13A shows data elements between two connected services can be mapped during design-time, with a mapping tool, where the mapping tool allows data elements of different types to be mapped when a logical conversion of data elements exist between the mapped types.

FIG. 13B shows how data is automatically transferred from one service to another by a runtime system that automates data transfer and data conversion based on the mapping defined in FIG. 13A.

DESCRIPTION OF THE PREFERRED EMBODIMENTS

The performance shortcomings of the prior art are overcome and additional advantages in automating data mapping across arbitrarily defined data structures are provided through a method of storing, assigning and retrieving data elements that belong to arbitrarily defined data structures, given prior knowledge of the structure of the data. This method assumes that each data element is associated to a data structure and a description for each data structure is available. The description of a data structure must include the name, and optionally the type of each data element. The description must also accommodate a type of element, hereon referred to as a "Data Container". A Data Container is a divisible data element, whose purpose is to contain other data elements. Furthermore, each type of element can have an associated Boolean attribute indicating the plurality of the expected data where one value for the attribute indicates that the data is singular and the other value indicates that the associated data may be plural. Additionally, a default value, and a Boolean attribute indicating whether the corresponding data value at runtime is required or optional, may be associated to each data element where applicable. Other attributes associated with each data type may indicate data range, allowed data values, data format or other enforceable restrictions for each data type.

In one embodiment of the above method of storing and retrieving data, methods are provided to store and retrieve data associated to well-defined inputs and outputs of a software interface including, but not limited to, a Web service. Here, an in-memory representation of the description of the inputs and outputs of software service, described by WSDL (Web Service Description Language) in the case of Web services, is used to mold the signature of the data structures associated to the service inputs and outputs in a specially designed data component. The molded information includes, but is not limited to, the expected hierarchy and structure of the data, the name of the data elements, the type of the data elements, default values for the data elements and whether data values for the corresponding data types are required or optional at runtime.

The specially designed data Component is used to store data corresponding to an arbitrarily defined data structure that may be associated to the inputs or outputs of a software service. The data Component has a lookup table for storing the molded data type definition information, as well as the data defined by the data type definition.

The following unique technique is used for molding a data Component: A unique lookup table key is determined for each data element within a hierarchical structure by traversing the hierarchy of parent Data Containers: a) If all parent Data Containers are declared to be singular, the resulting key will contain a concatenation of the names of all the Data Containers, each name separated by any character not allowed as part of the name identifying the Data Container, concatenated with the name of the data element. b) Otherwise, each time a Data Container with plurality is crossed, a new object that holds a data structure containing a sequence of Components, hereon referred to as ComponentList, is instantiated and inserted in the lookup table of the last Component crossed with a key that is the result of concatenation of the name of all the Data Containers so far, the variable representing the Data Containers so far is reset to the empty string, the last component crossed is set to the first component of the newly instantiated ComponentList, and the rest of the corresponding data structures is traversed applying the same logic until no more list Data Containers are crossed and the leaf data element is reached. Many variations of this step can be applied. For example, the molding of a path that crosses a ComponentList can be delayed at runtime until a corresponding Component needs to be inserted in the associated ComponentList. Note that a ComponentList corresponds to a Data Container with plurality according to the definition of the data structure.

Once a key corresponding to the path of a data element is molded in the lookup table of a Component, an appropriate marker object is inserted as the value of the key. For example, if the key corresponds to a traversal path of a plural Data Container that is required at runtime, the value of the key maybe a marker indicating: LIST_DATA_CONTAINER_REQUIRED. In an object-oriented language, the marker may be a static Object of a class defined for this purpose. In a procedural programming language, this marker may be identified by a unique integer value.

Based on the technique described above, all the leaf data elements (i.e. non-divisible data elements) in a hierarchical structure of data will be stored in the same Component (more precisely, the same lookup table of the Component) as long as all of the embedded data structures crossed in the path of accessing the data element are singular. A new Component (within a ComponentList) is only created when an embedded data structure is plural and the new Component corresponds to an entry of the plural data structure.

To reduce the system memory requirements and improve performance while accommodating multiple instances of the same molded data structure, the following technique can be used: a molded set of Components corresponding to a data structure is created and cached. Each time there is a request for molding another instance of that structure, a copy of the cached molded Component with all its contents is returned. In this way, all the keys of the molded Components can point to the same values and thus save memory by the fact that separate storage is not used for the same key values.

To provide data access and modification methods, the molded data Component provides methods for setting and getting data values in correspondence to the traversal path according to the way the Component keys were populated. For example to set a singular data element, a setAtomicData method that takes a key and a value as arguments can be used. The user of the method needs to create a key corresponding to the relative path of singular Data Containers crossed for accessing the data element that is the concatenation of the name of all the elements crossed, separated with appropriate name separators. In order to cross plural Data Containers, the Component provides a method: getComponentList with an argument signifying the relative path for the Component List corresponding to the plural Data Container and according to the method of molding described. Once a handle to a ComponentList is obtained, the user can create new Components corresponding to the plural structure with a method addComponent, on the ComponentList, and then add data values to a specific component.

A concrete example is in order: consider a data structure defined as a singular Data Container named Part, and a data element under Part, named Number. To set the value '101' on the Number element, given a Component instance, Comp, that is molded based on the Part data structure, the user makes the following call: Comp.setAtomicData("Part\name", "101"). Now, consider a Data Container named SalesOrder with a plural Data Container structure under it named Lines; furthermore, consider the Part structure to be embedded under the Lines structure. Now, assume that a molded Component, Comp, is instantiated corresponding to the SalesOrder structure. In order to set the value '101' on the Number element, under the Part Data Container, first the ComponentList instance, say CompList, corresponding to Lines is retrieved by calling: LinesCompList=Comp.getComponentList("SalesOrder.Lines"); then, a new Component corresponding to a single SalesOrder line is created, or the nth component by index would is retrieved. To add a new component, the following method can be called: LineComp=LinesCompList.addComponent( ). This method returns the new component and then the following method can be used to set the Number element on the Line Component: LineComp.setAtomicData("Part\Name", "101").

For a person expert in the art, it is easy to add all methods required for setting and getting the value of plural data elements (such as setAtomicListData), or to set and get other specific data types. The important point here is the key-based retrieval and assignment method and the unique way of molding and traversing data components.

Through the use of markers, inserted at the time of molding the Components according to the definition of the underlying data structures, the method of the present invention can provide automatic enforcement of data integrity. For example, a verifyAllRequiredDataAreSupplied method can be provided on Component and ComponentList objects to verify that all required data has been supplied. If a required data element was never set, the presence of static markers signifying REQUIRED data, indicate that the mold marker was never overwritten and thus a particular data element with a known path was never set. By associating a type system to the in-memory representation of a data structure definition, additional information about the expected type of each data element can be molded within a Component. The type system can be used to enforce the integrity of data based on the declared types through the implementation of the methods provided for setting data on the Component object.

We now turn to FIGS. 4 through 9 to focus our attention on a method of defining data mappings between two arbitrarily defined structures and automating the actual transfer of data based on a description of the mapping. Shown in FIG. 4, FIG. 6 and FIG. 8, a mapping tool enables the user to graphically map data elements from two data structures, associated with the inputs and outputs of two software services. The same mapping tool can be used to graphically map data elements from many-to-many software services, for example, FIG. 12 illustrates a mapping between many services to one service and one service to many services. A unique description of the mapping, supporting the automatic transfer of data using the method of the present invention is generated and stored for the runtime system.

FIG. 5, FIG. 7, and FIG. 9, provide an XML representation of the mapping generated by the example shown in FIG. 4, FIG. 6, and FIG. 8, respectively. In general, there are two sides to the mapping: one is the 'FROM' side, the source of data, and the other is to the 'TO' side, where the data is being transferred. The mappings are organized based on the TO side of the mapping in a hierarchical fashion. FIG. 5, FIG. 7, and FIG. 9 show the ToListGroup XML tag that represents the beginning of the mapping definition. For each plural Data Container on the TO side, a ToListGroup is added to the containing ToListGroup that corresponds to the last plural Data Container crossed, or the root ToListGroup. Each ToListGroup element contains CPFromGroup tags that correspond to a relation between the root Data Container on the FROM side, or any plural Data Container on the FROM side. A CPFromGroup contains attributes containing the relative lookup key in the Component that contains the data on the FROM side corresponding to the structure of the data on the FROM side. Furthermore, the CPFromGroup element contains other information such as all the paths required for traversing Components corresponding to plural Data Containers that are embedded within other plural Data Containers as well as specific mapping within an element called a ConnectedPair. The ConnectedPair element contains the relative data path of the data element on the FROM side of the mapping and the relative data path of the data element on the TO side of the mapping as well as other information.

In the method of the present invention, the Components within a ComponentList on the TO side can only be driven by the number of Components within a single ComponentList corresponding to a CPFromGroup on the FROM side. One exception to this rule is displayed in FIG. 10 and FIG. 10, when more than one CPFromGroup drives the insertion of Components on the TO sides ComponentList where all the driving ComponentLists of the FROM side have a hierarchical relationship. In which case, the data from the FROM side is said to have been 'Flattened'. These rules are enforced through the graphical mapping tool used to generate mapping metadata [FIG. 10].

Using the method of storing and retrieving of the present invention coupled with the method of expressing the mapping metadata, the system of this invention can easily automate the transfer of data from many Components to many Components corresponding to arbitrarily defined data structures. In one embodiment of the present invention, the in-memory representation of the ToListGroup mapping structure can be recursively traversed while the root Component corresponding to the TO side is traversed, or created if it doesn't exist, parallel to the traversal of the corresponding ToListGroup. While visiting each ToListGroup, if a CPFromGroup exists, a ComponentList is added to the TO side, and for each Component from the ComponentList on the FROM side, a Component is added to the ComponentList of the TO side and the data corresponding to all the relative data paths are looked up from the FROM Component and transferred to the corresponding TO Component.

Based on the method of the present invention, inputs/outputs from one or more software services may be mapped to a data-driven programming construct such as a decision (or branching) construct. FIG. 8 shows an example where the TO side of the mapping is a decision construct.

As illustrated in FIG. 13A and FIG. 13B, the method of the present invention provides for automatic data conversion during runtime when two data elements of different types are mapped to each other during design-time, and when there exists a logical conversion between the two types. For example, an Integer value of 0 can be converted to a Boolean value of 'false', whereas any non-zero Integer value can be converted to a Boolean value of 'true'. A mapping tool can prevent a user from mapping two data elements of different types when a logical conversion of the data is not possible upon transfer.

What is claimed is:

1. In a computer network comprising two or more arbitrarily defined data structures, each of the data structures comprising one or more leaf data elements, a description of each data structure being known, a system for transferring data from a first in-memory data component corresponding to a first data structure to a second in-memory data component corresponding to a second data structure, the system comprising:

a) a mapping tool configured to:

allow a user to graphically define a relation and association between leaf data elements of a first data structure description and leaf data elements of a second data structure description; and generate one or more mapping descriptions of the relation and association between the leaf data elements of the first data structure description and the leaf data elements of the second data structure description as defined by the user; and b) a high-performance run-time engine configured to:

dynamically generate a first in-memory data component containing actual data associated with the leaf data elements of the first data structure description, the high-performance run-time engine using a key-based look-up molding technique to generate a unique key to dynamically store and locate the actual data for each of the leaf data elements, the first in-memory data component comprising at least one lookup table configured to store each unique key for the first in-memory data component;

traverse the one or more mapping descriptions and accessing the at least one lookup table of the first in-memory data component to get actual data stored in the first in-memory data component using a key-based look-up technique;

dynamically generate a second in-memory data component configured to store actual data associated with the leaf data elements of the second data structure description, the high-performance run-time engine using the key-based look-up molding technique to generate a unique key to dynamically store and locate the actual data for each of the leaf data elements, the second in-memory data component comprising at least one lookup table configured to store each unique key for the second in-memory data component; and transfer data between the first in-memory data component and the second in-memory data component according to the one or more mapping descriptions.

2. The system as recited in claim 1, wherein the mapping tool is further configured to store the one or more mapping descriptions in a machine readable format.

3. The system as recited in claim 2, wherein the machine readable format is XML.

4. The system as recited in claim 1, wherein the one or more mapping descriptions is expressed using a unique path identifier with an absolute and relative path addressing scheme.

5. The system as recited in claim 1, further comprising a cache configured to store the one or more mapping descriptions and configured to respond to multiple requests for accessing the one or more mapping descriptions.

6. The system as recited in claim 1, wherein the mapping tool is further configured to allow a user to graphically define a one-to-one relation and association between the leaf data elements of the first data structure description and the leaf data elements of the second data structure description.

7. The system as recited in claim 1, wherein the mapping tool is further configured to allow a user to graphically define a one-to-many relation and association between the leaf data elements of the first data structure description and the leaf data elements of the second data structure description.

8. In a distributed computer system comprising one or more data structures, a method for generating keys for use in dynamically storing and retrieving actual data of a data structure in order to use the actual data of the data structure to perform data transfer functions, the method comprising:

identifying a hierarchy of one or more data containers in a first data structure description, wherein a data container can be defined as either a singular data container or a plural data container, wherein at least one of the data elements in the one or more data containers is a leaf data element;

traversing the hierarchy of one or more data containers in the first data structure description to determine a unique key for each leaf data element of the first data structure description, comprising at least one of:

determining whether all of the one or more data containers in the first data structure description are singular data containers, wherein, for each leaf data element, a key is generated containing a concatenation of all names of the data containers in a hierarchical path to the leaf data element, each data container name separated by a character that is not allowed as part of the data container name, concatenated with a name of the leaf data element, and storing the key in a lookup table of a single in-memory data component; or determining whether one or more data containers in the first data structure description is a plural data container, wherein upon identifying a plural data container, a component list is instantiated in a lookup table having a key that is generated containing a concatenation of names of all the data containers traversed either from a root node or from a previous plural data container to a hierarchical path to the identified plural data container, the component list comprising a plurality of data components; and outputting the key to be used by a run-time engine to get actual data of a corresponding leaf data element of the first data structure.

9. The method as recited in claim 8, further comprising, upon identifying a plural data container, further comprising, for each leaf data element, generating a key containing a concatenation of names of all the data containers traversed from the previous plural data container to the hierarchical path of the leaf data element, each data container name separated by a character that is not allowed as part of the data container name, concatenated with a name of the leaf data element, and storing the key in one of the plurality of data components.

10. The method as recited in claim 8, further comprising inserting a marker object as the value of the generated key.

11. The method as recited in claim 10, wherein the marker object is one of a string, a static object of a class, or a unique integer value.

12. The method as recited in claim 8, further comprising storing in cache one or more lookup tables containing the first data structure description;

receiving a request for generating another lookup table for the first data structure description; and returning a copy of the cached one or more lookup tables for the first data structure description.

13. The method as recited in claim 8, further comprising modifying actual data of at least one leaf data element of the first data structure description by including in a request a key generated for the leaf data element and sending the request to a lookup table of the leaf data element key to modify a data field corresponding to the leaf data element.

14. The method as recited in claim 8, further comprising
using a mapping tool to define a relation and association between leaf data elements of the first data structure description and leaf data elements of a second data structure description; and
automating transfer of the actual data associated with the leaf data elements of the first data structure description stored in the first in-memory data component to the second in-memory data component based on a mapping description of the relation and association between leaf data elements of the first data structure description and leaf data elements of the second data structure description, further comprising accessing one or more lookup tables of the first in-memory data component.

15. The method as recited in claim 14, further comprising storing in memory the mapping description of the relation and association between leaf data elements of the first data structure description and leaf data elements of the second data structure description.

16. The method as recited in claim 14, wherein the mapping description of the relation and association between leaf data elements of the first data structure description and leaf data elements of the second data structure description includes identification of built-in-functions, further comprising transferring the actual data associated with the leaf data elements of the first data structure description stored in the first in-memory data component to the second in-memory data component using the built-in functions.

17. The method as recited in claim 14, wherein the mapping description of the relation and association between leaf data elements of the first data structure description and leaf data elements of the second data structure description includes leaf data elements from the first data structure description being flattened.

18. The method as recited in claim 8, further comprising enforcing a well-defined set of rules to restrict users as to data types that can be used to define the data elements of the first data structure description, the enforceable restrictions being one or more of whether the data type is singular or plural, a default value for the data type, whether the data type indicates that a corresponding data value is required at runtime, a data range for the data type, allowed data values for the data type, a data format for the data type, or other enforceable restrictions for each data type.

\* \* \* \* \*